US008008359B2

(12) United States Patent
Steynberg et al.

(10) Patent No.: US 8,008,359 B2
(45) Date of Patent: *Aug. 30, 2011

(54) METHOD OF OPERATING A FLUID BED REACTOR

(75) Inventors: Andre Peter Steynberg, Vanderbijlpark (ZA); Berthold Berend Breman, Zutphen (NL); Derk Willem Frederik Brilman, Delden (NL)

(73) Assignee: Sasol Technology (Proprietary) Limited, Chicago, IL (US)

( * ) Notice: Subject to any disclaimer, the term of this patent is extended or adjusted under 35 U.S.C. 154(b) by 819 days.

This patent is subject to a terminal disclaimer.

(21) Appl. No.: 11/908,923

(22) PCT Filed: Mar. 17, 2006

(86) PCT No.: PCT/IB2006/050835
§ 371 (c)(1),
(2), (4) Date: Sep. 17, 2007

(87) PCT Pub. No.: WO2006/097904
PCT Pub. Date: Sep. 21, 2006

(65) Prior Publication Data
US 2008/0146683 A1 Jun. 19, 2008

(30) Foreign Application Priority Data
Mar. 17, 2005 (ZA) .................... 2005/02263

(51) Int. Cl.
*C07C 27/00* (2006.01)
(52) U.S. Cl. ...................... 518/700; 518/705
(58) Field of Classification Search .............. 518/700, 518/705
See application file for complete search history.

(56) References Cited

U.S. PATENT DOCUMENTS

| 2,853,369 | A | 9/1958 | Kolbel et al. |
| 6,060,524 | A | 5/2000 | Casanave et al. |
| 6,375,921 | B1 | 4/2002 | Eickhoff et al. |
| 6,812,260 | B2 * | 11/2004 | Osora et al. .................. 518/713 |
| 2002/0035163 | A1 | 3/2002 | Vogel et al. |

FOREIGN PATENT DOCUMENTS

| FR | 1 603 547 | 5/1971 |
| GB | 728543 | 4/1955 |
| WO | 99/00191 A2 | 1/1999 |
| WO | 02/096835 A2 | 12/2002 |
| WO | 02/100981 A1 | 12/2002 |
| WO | 2004/101475 A1 * | 11/2004 |
| WO | 2005/049194 A1 | 6/2005 |
| WO | 2006/097905 A1 | 9/2006 |

* cited by examiner

*Primary Examiner* — Jafar Parsa
(74) *Attorney, Agent, or Firm* — Fitch, Even, Tabin & Flannery

(57) ABSTRACT

Method of operating a three-phase slurry reactor includes feeding at a low level at least one gaseous reactant into a vertically extending slurry body of solid particles suspended in a suspension liquid, the slurry body being contained in at least two vertically extending shafts housed within a common reactor shell, each shaft being divided into a plurality of vertically extending channels at least some of which are in slurry flow communication and the slurry body being present in at least some of the channels. The gaseous reactant is allowed to react as it passes upwardly through the slurry body present in at least some of the channels of the shafts, thereby to form a non-gaseous and/or a gaseous product. Gaseous product, if present, and/or unreacted gaseous reactant is allowed to disengage from the slurry body in a head space above the slurry body.

9 Claims, 2 Drawing Sheets

METHOD OF OPERATING A FLUID BED REACTOR

CROSS REFERENCE TO RELATED APPLICATIONS

This application is a 35 U.S.C 371 application of International Patent Application No PCT/IB2006/050835 filed Mar. 17, 2006 claiming priority from ZA 2005/02263 filed Mar. 17, 2005.

THIS INVENTION relates to a method of operating a fluid bed reactor and to a fluid bed reactor.

BACKGROUND TO THE INVENTION

Considerable risk is encountered when technology is scaled up from pilot plant scale to commercial plant scale in order to reap the benefits of economy of scale. Fluid bed reactors, such as three-phase slurry reactors and two-phase fluidised bed reactors, typically exhibit scale-dependent macro-mixing effects and the aforementioned risk is thus applicable when fluid bed reactors are scaled up. It will thus be an advantage if a method can be found which can significantly reduce the risk associated with upscaling of fluid bed reactors. In addition, reactor designs in which the mixing patterns inside the reactor can be more readily modelled or predicted from experimentation have the benefit that the extent of usually undesirable back-mixing can be limited thereby potentially allowing an optimal combination of desirable plug-flow characteristics (usually good productivity and good selectivity) and well-mixed characteristics (often required for desirable solids distribution and even temperature profiles).

The applicant is aware of U.S. Pat. No. 6,375,921, WO 99/00191, FR 1603546, U.S. Pat. No. 2,853,369 and GB 728543. U.S. Pat. No. 6,375,921 discloses a three-phase slurry vessel with perforated trays with a substantially uniform distribution of holes, which can be used for counter-current operation. WO 99/00191 is concerned with methods for in-situ regeneration of partially and reversibly deactivated catalysts used in bubble column reactors. This document proposes providing a reactor shell in which is placed a draft tube located coaxially within the reactor shell. FR 1603546 deals with problems associated with growing yeast on an industrial scale, more particularly with problems regarding ensuring good contact of the yeast with oxidising gas and two immiscible liquid phases. FR 1603546 proposes a reactor defining a flow path having intercalated concentrically arranged upflow and downflow channels. U.S. Pat. No. 2,853,369 attempts to address the problem of back-mixing by subdividing a reactor into a plurality of channels. GB 728543 is concerned with improving hydrocarbon synthesis in a slurry reactor. This document teaches the use of a tower-like reactor with cooling being performed in a number of vertically spaced stages in the reactor. None of these documents deals specifically with ways to reduce the risk encountered when technology is scaled up from pilot plant scale to commercial plant scale, or proposes reactor designs in which the mixing patterns inside the reactor can be more readily modelled or predicted from experimentation.

SUMMARY OF THE INVENTION

According to one aspect of the invention, there is provided a method of operating a two-phase fluidised bed reactor, the method including feeding at a low level at least one gaseous reactant into a vertically extending fluidised body of solid particles, the fluidised body being contained in at least two vertically extending shafts housed within a common reactor shell, each shaft being divided into a plurality of vertically extending channels at least some of which are in flow communication and the fluidised body being present in at least some of the channels;

allowing the gaseous reactant to react as it passes upwardly through the fluidised body present in at least some of the channels of the shafts, thereby to form a gaseous product;

allowing gaseous product and/or unreacted gaseous reactant to disengage from the fluidised body in a head space above the fluidised body; and withdrawing gaseous product and unreacted gaseous reactant, if present, from the head space.

Typically, the withdrawn gaseous product and unreacted gaseous reactant include solid particles from the fluidised body. The method may thus include separating the solid particles from the gases, e.g. by means of cyclones. The method may also include returning the separated solid particles to the fluidised body.

The method may include maintaining the fluidised body at a desirable level by adding or removing solid particles, e.g. by means of pneumatic methods. Preferably, a tail gas is used in such pneumatic methods to fluidise the solid particles if they are to be added to the fluidised body.

The invention extends to a method of operating a three-phase slurry reactor as hereinafter described. In describing the invention further, reference is thus made to a slurry body instead of a fluidised body. It is however to be appreciated that what is stated in respect of the invention with reference to a slurry body or slurry is also applicable to the invention with reference to a fluidised body of solid particles, unless it would clearly be understood not to be applicable by a person skilled in the art of fluid bed reactors.

Thus, according to another aspect of the invention, there is provided a method of operating a three-phase slurry reactor, the method including feeding at a low level at least one gaseous reactant into a vertically extending slurry body of solid particles suspended in a suspension liquid, the slurry body being contained in at least two vertically extending shafts housed within a common reactor shell, each shaft being divided into a plurality of vertically extending channels at least some of which are in slurry flow communication and the slurry body being present in at least some of the channels;

allowing the gaseous reactant to react as it passes upwardly through the slurry body present in at least some of the channels of the shafts, thereby to form a non-gaseous or a gaseous product;

allowing gaseous product, if present, and/or unreacted gaseous reactant to disengage from the slurry body in a head space above the slurry body;

withdrawing gaseous product, if present, and/or unreacted gaseous reactant from the head space; and if necessary, maintaining the slurry body at a desired level by withdrawing suspension liquid, including non-gaseous product if present, or by adding suspension liquid.

The method may include passing a heat transfer medium through some of the channels of the shafts, the heat transfer medium-containing channels of a shaft being in flow communication.

The channels of a shaft may be in parallel planes and may alternately contain the slurry body and the heat transfer medium.

Instead, the method may include surrounding the channels of a shaft with heat transfer medium. The channels may thus be in the form of vertically extending tubes, with the shafts being defined by vertically extending side walls dividing the reactor. The side walls may form chords of the shell when the shell is circular cylindrical and when seen in horizontal section.

Heat transfer surfaces of the reactor, such as those of the tubes and/or the side walls, may optionally be shaped or textured to increase their heat transfer surface area or to improve heat transfer coefficients, compared to those of smooth cylindrical tubes or smooth side walls. The shaping or texturing may include, amongst other methods known to persons skilled in the art, the use of dimpled, ribbed or finned tubes or plates.

Slurry flow communication between channels in a shaft preferably only occurs at top and/or bottom ends of such channels.

As will be appreciated, each shaft with its channels acts as a slurry bubble reactor or three-phase slurry reactor (or in the case of a fluidised bed reactor, as a two-phase fluidised bed reactor). Design and testing of a single shaft on a pilot scale is feasible, with a commercial scale reactor then including a plurality of the shafts, thereby substantially reducing the risk of scale-up.

While it is believed that the method according to the second aspect of the invention can, at least in principle, have broader application, it is envisaged that the solid particles will normally be catalyst particles for catalysing the reaction of the gaseous reactant or gaseous reactants into a product, i.e. a liquid product and/or a gaseous product. The suspension liquid will normally, but not necessarily always, be liquid product, with liquid phase thus being withdrawn from the slurry body to maintain the slurry body at a desired level.

Furthermore, while it is also believed that, in principle, the method according to the second aspect of the invention can have broader application, it is envisaged that it will have particular application in hydrocarbon synthesis where the gaseous reactants are capable of reacting catalytically exothermically in the slurry body to form liquid hydrocarbon product and, optionally, gaseous hydrocarbon product. In particular, the reaction or hydrocarbon synthesis may be Fischer-Tropsch synthesis, with the gaseous reactants being in the form of a synthesis gas stream comprising mainly carbon monoxide and hydrogen, and with both liquid and gaseous hydrocarbon products being produced and the heat transfer medium being a cooling medium, e.g. boiler feed water.

The method may include allowing slurry to pass downwardly from a high level in the slurry body to a lower level thereof, using one or more channels in the shafts. This may include preventing gaseous reactant or reactants from entering one or more channels in the shafts, e.g. by providing a baffle, thereby allowing these channels to act as downcomers, and/or it may include degassing the slurry in the channel, e.g. by adding a degasser to an upper end of the channel.

The process may include cooling the gas from the head space to condense liquid product, e.g. liquid hydrocarbons and reaction water, separating the liquid product from the gases to provide a tail gas, and recycling at least some of the tail gas to the slurry body as a recycle gas stream.

At least some individual shafts may each have a gaseous reactant inlet. The method may include feeding the gaseous reactant or reactants, or recycle gas, to these individual shafts. The gaseous reactant or reactants may be fed independently from the feed to another shaft, particularly another shaft at the same elevation.

At least some of the shafts may each have a slurry or a suspension liquid outlet or inlet. The method may include maintaining the slurry body level in these shafts by adding or withdrawing slurry or suspension liquid through the liquid inlet or outlet. The suspension liquid or slurry may be added to or withdrawn from a shaft independently from another shaft, particularly another shaft at the same elevation.

At least some of the shafts may each include or define a filtration zone for the removal of liquid phase from the reactor. The liquid phase may be withdrawn from a shaft independently from another shaft.

At least two of the vertically extending shafts may be vertically spaced, with an upper end of a lower shaft being below a lower end of an upper shaft. The method may include allowing slurry to pass downwardly from a high level in the slurry body in the upper shaft to a lower level thereof, and the method may include allowing slurry to pass downwardly from a high level in the slurry body of the lower shaft to a lower level thereof. The method of the invention thus allows slurry redistribution or recycle over selected vertically extending regions of the reactor, which is less detrimental to plug flow behaviour than slurry recycle over the total reactor height. At the same time, as a result of the use of the channels, the desirable features of a high aspect ratio (length/diameter ratio) for the reactor are realised. However, if desired, the method may include allowing slurry to pass downwardly from a high level in the slurry body in the upper shaft to a low level in the slurry body in the lower shaft, e.g. by having channels which are vertically in register, or which are vertically connected to be in flow communication, acting as downcomers.

The method may include feeding recycle gas at an elevated level into the slurry body, so that said recycle gas passes only through the upper shaft or upper shafts and bypasses the lower shaft or lower shafts.

The method may include preventing slurry flow communication between adjacent shafts, or between all shafts at the same elevation. Instead, the method may allow slurry communication between adjacent shafts at an elevation between the upper ends and lower ends of the shafts, or the method may include allowing slurry flow communication between shafts at the lower ends of the shafts, particularly between the lower ends of lower shafts. The method may also include allowing slurry flow communication between shafts in one vertical region, but preventing slurry flow communication in a different vertical region between the same shafts to hinder the establishment of macro-mixing patterns.

According to a further aspect of the invention, there is provided a two-phase fluidised bed reactor, the reactor including
  a reactor shell housing at least two vertically extending sub-reactors each defining a plurality of vertically extending channels at least some of which are in flow communication and which define a fluidised bed zone which, in use, will contain a fluidised body of solid particles;
  a gas inlet in the reactor shell for introducing a gaseous reactant or gaseous reactants into the reactor; and
  a gas outlet in the reactor shell for withdrawing gas from a head space in the reactor shell above one or more of the sub-reactors.

The fluidised bed reactor may include a solid particles inlet or outlet for adding or withdrawing solid particles to or from the reactor.

According to yet another aspect of the invention, there is provided a three-phase slurry reactor, the reactor including
  a reactor shell housing at least two vertically extending sub-reactors each defining a plurality of vertically extending channels at least some of which are in slurry flow communication and which define a slurry zone which, in use, will contain a slurry of solid particles suspended in a suspension liquid;

a gas inlet in the reactor shell for introducing a gaseous reactant or gaseous reactants into the reactor;

a gas outlet in the reactor shell for withdrawing gas from a head space in the reactor shell above one or more of the sub-reactors; and if necessary, a liquid inlet or a liquid outlet for adding or withdrawing slurry or suspension liquid to or from the reactor.

Typically, at least some of the sub-reactors of the slurry reactor include or define a filtration zone for the removal of liquid phase from the reactor.

The sub-reactors may include a plurality of vertically extending divider walls which between them define the vertically extending channels. One or more vertically extending side walls of a sub-reactor may be defined by a divider wall of one or more adjacent sub-reactors.

Typically, at least some of the channels are heat transfer medium flow channels, having heat transfer surfaces.

Instead, the sub-reactors may include a plurality of vertically extending tubes, each tube defining a channel. Vertically extending baffles or side walls may define sides of the sub-reactors. Two adjacent sub-reactors may share a common baffle or side wall. The side walls may be as hereinbefore described.

Typically, the tubes have a diameter of at least 10 cm.

Heat transfer surfaces of the reactor, such as those of the tubes and/or the side walls may optionally be shaped or textured to increase their heat transfer surface area or to improve heat transfer coefficients compared to those of smooth cylindrical tubes or smooth side walls. The shaping or texturing may include, amongst other methods known to persons skilled in the art, the use of dimpled, ribbed or finned tubes or plates.

When the sub-reactors include a plurality of vertically extending divider walls which between them define the vertically extending channels, at least some of the channels may be heat transfer medium flow channels. When the sub-reactors include a plurality of vertically extending tubes, a heat transfer medium flow space may be defined between the baffles or side walls of a sub-reactor, the heat transfer medium flow space thus surrounding the tubes.

Typically, the heat transfer medium flow channels or the heat transfer medium flow space are/is in flow communication with a heat transfer medium inlet arrangement and a heat transfer medium outlet arrangement. The heat transfer medium inlet arrangement and the heat transfer medium outlet arrangement may serve all of the heat transfer medium flow channels in a sub-reactor. The heat transfer medium inlet or outlet arrangement of one sub-reactor may be in flow communication respectively with the heat transfer medium inlet or outlet arrangement of another sub-reactor.

The heat transfer medium flow channels and the channels defining slurry or fluidised bed zones may be arranged alternately.

The reactor may include one or more of the sub-reactors arranged at a lower level in the shell and one or more sub-reactors arranged at a higher level in the shell, such that lower ends of channels of the upper sub-reactor(s) are above upper ends of the channels of the lower sub-reactor(s).

The reactor may include an intermediate zone between the upper sub-reactor(s) and the lower sub-reactor(s). The intermediate zone may be in flow communication with slurry or fluidised bed zone channels of an upper sub-reactor or upper sub-reactors and with slurry or fluidised bed zone channels of a lower sub-reactor or lower sub-reactors.

The gas inlet may be arranged to feed a gaseous reactant or gaseous reactants directly into at least some of the sub-reactors, at low elevations in the sub-reactors. Typically, the gas inlet is arranged to feed a gaseous reactant or gaseous reactants directly into each of the lower sub-reactors, at low elevations in these lower sub-reactors.

The reactor may include a recycle gas inlet. The recycle gas inlet may be arranged to feed recycle gas directly into at least some of the sub-reactors. The recycle gas inlet may be arranged to feed recycle gas directly into each of the lower sub-reactors and/or each of the upper sub-reactors. When being arranged to feed recycle gas directly to the upper sub-reactors, the recycle gas inlet may be arranged to feed the recycle gas into the intermediate zone.

One or more channels of a sub-reactor may be a downcomer channel. A downcomer channel may be provided at its lower end with a gassing prevention device, e.g. a baffle, and/or it may be provided at its upper end with a degasser. A downcomer channel in an upper sub-reactor may be in register or in flow communication with a downcomer channel in a lower sub-reactor. Instead, a downcomer channel in an upper sub-reactor may be horizontally spaced or staggered from a downcomer channel in a lower sub-reactor directly beneath the upper sub-reactor.

Preferably, each sub-reactor has a vertically extending side facing the shell or being defined by the shell. This allows for piping arrangement to or from each sub-reactor.

Adjacent sub-reactors at a particular elevation in the shell may be isolated from one another as far as slurry or fluidised body flow communication is concerned. However, in one embodiment of the invention, slurry or fluidised body flow communication between adjacent sub-reactors is provided for below the lower sub-reactors, i.e. in a bottom of the reactor. Also, in one embodiment of the invention, slurry or fluidised body flow communication is provided for between adjacent upper sub-reactors, below the upper sub-reactors but above the lower sub-reactors. Typically, this is achieved by allowing slurry or fluidised body flow between adjacent upper sub-reactors, in the intermediate zone.

Typically, where slurry or fluidised body flow communication between sub-reactors at the same elevation has been allowed, slurry or fluidised body flow communication is not allowed between sub-reactors that are in register with the sub-reactors between which slurry or fluidised body flow communication has been allowed, but which are located at another elevation.

Typically, slurry or fluidised body flow communication between upper ends of adjacent upper sub-reactors is prevented. Thus, although the head space above the upper sub-reactors is common to the upper sub-reactors, slurry or fluidised body is typically prevented from flowing from the upper end of a channel of one sub-reactor to another adjacent sub-reactor, e.g. by means of side walls of the sub-reactors extending into the head space above a normal slurry or fluidised bed level in each upper sub-reactor.

BRIEF DESCRIPTION OF THE DRAWINGS

The invention will now be described in more detail with reference to the accompanying drawings, in which.

DETAILED DESCRIPTION OF THE INVENTION

Figure 1:
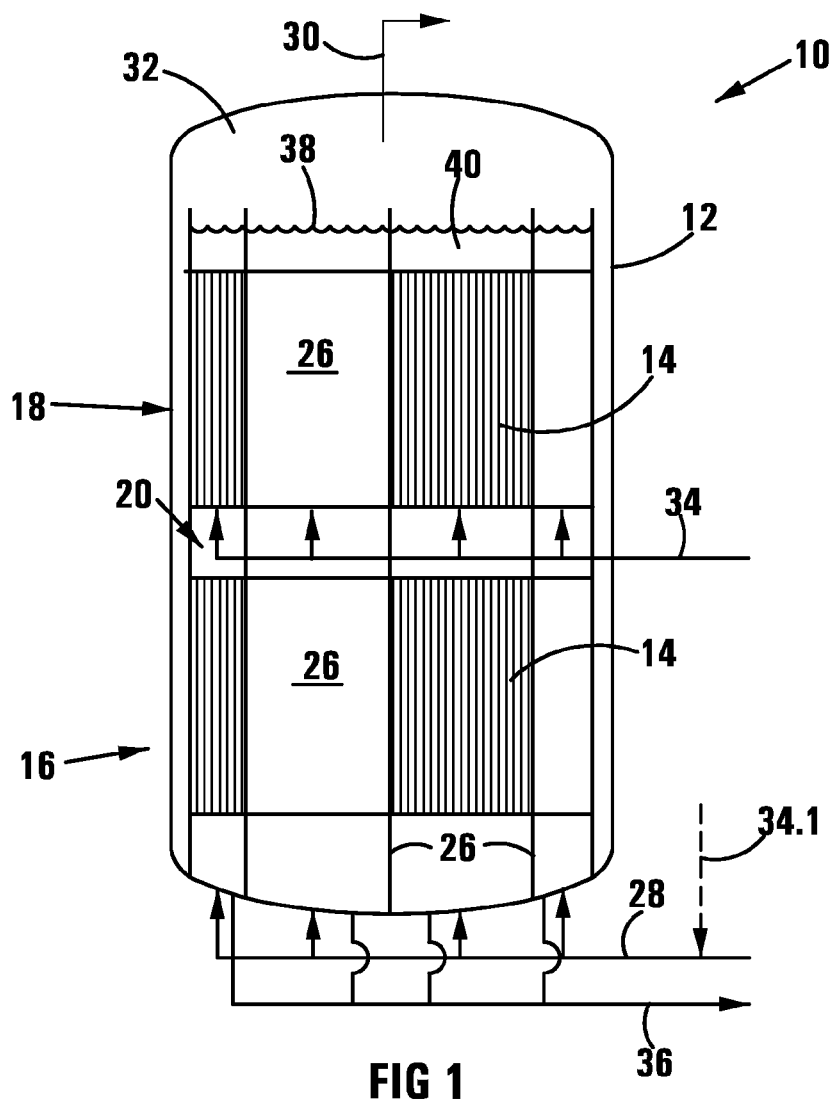
FIG. 1 shows schematically an elevational sectional view of a three-phase slurry reactor in accordance with the invention.
Figure 2:
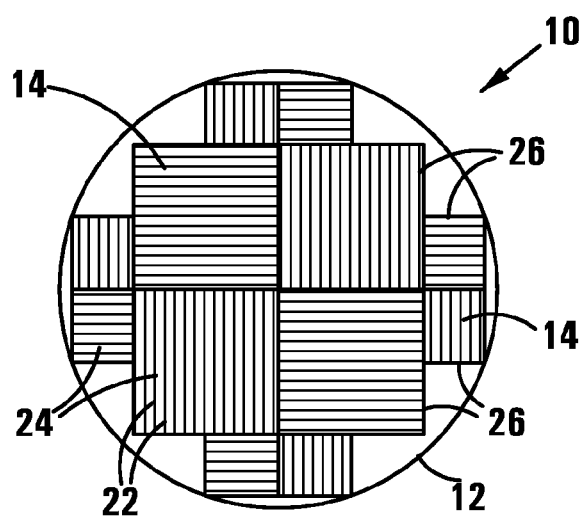
FIG. 2 shows a sectional top plan view of the slurry reactor of FIG. 1.

Referring to FIGS. 1 and 2 of the drawings, reference numeral 10 generally indicates a three-phase slurry phase reactor in accordance with the invention. The reactor 10 is suitable for hydrocarbon synthesis in a process in which gaseous reactants in the form of a synthesis gas are reacted in a slurry body or slurry bed comprising a product suspension liquid and catalyst particles.

The reactor 10 includes a reactor shell 12 housing twenty-four parallelipipedal sub-reactors 14. The sub-reactors 14 are grouped in groups of twelve each, with one group generally indicated by reference numeral 16 being lower sub-reactors and another group, generally indicated by reference numeral 18 being upper sub-reactors. The upper sub-reactors are vertically spaced from the lower sub-reactors leaving an intermediate zone 20 between the upper sub-reactors 18 and the lower sub-reactors 16.

Each sub-reactor 14 includes a plurality of vertically extending metal divider walls or plates 22 which between them define vertically extending channels 24. The sub-reactors 14 also have side walls 26. As can be clearly seen in FIG. 2, the side walls 26 of some of the sub-reactors 14 are defined by a divider wall 22 of an adjacent sub-reactor 14, with the divider walls 22 of these two sub-reactors 14 being perpendicularly arranged.

Although not shown in FIGS. 1 and 2, at least some of the divider walls or plates 22 may be shaped or textured to increase their heat transfer surface area or to improve heat transfer coefficients. The shaping or texturing may include, amongst other methods known to persons skilled in the art, the use of dimpled, ribbed or finned plates.

The reactor 10 also includes a gas inlet 28 at a low elevation, below the lower sub-reactors 16 and a gas outlet 30 at a high elevation. The gas outlet 30 is in flow communication with a head space 32 in the shell 12 above the upper sub-reactors 18. A recycle gas inlet 34 leads into the intermediate zone 20 and a liquid or slurry outlet 36 leads from below the lower sub-reactors 16.

The channels 24 of each sub-reactor 14 are alternately slurry channels and cooling channels. In other words, in use, the channels 24 of a sub-reactor 14 contain either slurry, or boiler feed water as a heat transfer or cooling medium, with the slurry and boiler feed water being present in alternate channels. Each sub-reactor 14 is thus provided with a heat transfer medium inlet arrangement (not shown) and a heat transfer medium outlet arrangement (not shown). The heat transfer medium inlet arrangement of a sub-reactor 14 in use feeds boiler feed water into all of the cooling channels of the sub-reactor 14, at one end thereof. The heat transfer medium outlet arrangement withdraws the boiler feed water from all of the cooling channels, at the other end of the sub-reactor 14. The flow of the boiler feed water through the cooling channels may be either up or down, i.e. co-current or counter-current in use to gaseous reactants and gaseous product bubbles rising up through the slurry channels.

The slurry channels are open-ended. Unlike the slurry channels, the cooling channels have closed upper and lower ends, but are in flow communication with each other at their ends and with the heat transfer medium inlet and outlet arrangements, in a construction reminiscent of a plate heat exchanger.

In the embodiment of the invention shown in FIGS. 1 and 2, the side walls 26 of the lower sub-reactors 16 extend downwardly to the shell 12 where they are sealed against the shell 12. In other words, below the channels 24 of the lower sub-reactors 16, the lower sub-reactors 16 are not in flow communication. The gas inlet 28 thus feeds each of the lower sub-reactors 16 individually. Typically, a gaseous reactant flow controller (not shown) will be provided for each of the lower sub-reactors 16. Similarly, the liquid outlet 36 is arranged to withdraw liquid from below each of the lower sub-reactors 16 individually. Typically, a slurry body or slurry bed level controller (not shown) is associated with each of the upper sub-reactors 18, to control the withdrawal of liquid or slurry from the lower sub-reactors 16.

As can be seen in FIG. 1 of the drawings, in the intermediate zone 20, there is also no horizontal slurry flow communication between the lower sub-reactors 16 or between the upper sub-reactors 18, by virtue of the side walls 26 of either the upper or lower sub-reactors 16, 18 forming barriers in the intermediate zone 20. However, the lower sub-reactors 16 are in slurry flow communication with the upper sub-reactors 18 immediately above them. In other words, a sub-reactor 14 which is a lower sub-reactor and which is vertically in register with a sub-reactor 14 which is an upper sub-reactor, is in flow communication with the upper sub-reactor.

The side walls 26 of the upper sub-reactors 18 extend upwardly into the head space 32 to project upwardly above a normal slurry level indicated by reference numeral 38. As a result, at their upper ends, the upper sub-reactors 18 are also not in horizontal slurry flow communication, although they share the common head space 32.

The recycle gas inlet 34 feeds each upper sub-reactor 18 individually as shown schematically in FIG. 1. If desired, a recycle gas flow controller can be provided for each of the upper sub-reactors 18. The arrangement of the recycle gas inlet 34 in FIG. 1 is shown schematically only. In practice, as a result of the fact that each of the sub-reactors 14 typically has at least one side wall 26 facing the shell 12, it is typically easy to provide each of the upper sub-reactors 18 with an individual recycle gas inlet extending through the shell 12. Similarly, for the liquid outlet 36 and the gas inlet 28, if it is not desired to enter through the bottom of the shell 12, these piping arrangements can enter through the circular cylindrical shell 12 as the lower sub-reactors 16 also each have at least one side wall 26 facing the shell 12.

At least some of the slurry channels 24 of the upper sub-reactors 18 and the lower sub-reactors 16 are configured to function as downcomer channels. These channels are provided at their lower ends with a gassing prevention device, such as a baffle (not shown), and/or at their upper ends with a degasser (not shown). A downcomer channel in an upper sub-reactor 16 may be located directly above or may be in register with a downcomer channel of a lower sub-reactor 16. If desired, these two downcomer channels may also physically be connected so that they are in direct flow communication with one another. Instead, a downcomer channel in an upper sub-reactor 18 may be horizontally spaced or staggered from a downcomer channel in a lower sub-reactor 16.

The reactor 10 is suitable for many processes requiring a three-phase slurry reactor and requiring heat transfer to or from the slurry. However, only one use, namely hydrocarbon synthesis, will now be described.

In use, fresh synthesis gas comprising mainly carbon monoxide and hydrogen as gaseous reactants, is fed into the bottom of the reactor 10 through the gas inlet 28. The synthesis gas is fed individually into each of the lower sub-reactors 16 and is typically uniformly distributed through a sparger system (not shown) inside each of the lower sub-reactors 16. Simultaneously, a recycle gas stream (typically cooled) comprising typically hydrogen, carbon monoxide, methane and carbon dioxide is returned to the reactor 10 through the recycle gas inlet 34. All of the recycle gas stream may be fed into the upper sub-reactors 18 by means of the recycle gas inlet 34 or, if desired, a portion of the recycle gas stream may be returned to the bottom of the reactor 10 as shown by the line 34.1 entering the gas inlet 28.

As with the fresh synthesis gas, the recycle gas is fed to each of the upper sub-reactors 18 individually and is typically uniformly distributed inside the upper sub-reactors 18 by means of a sparger system (not shown) inside each of the upper sub-reactors 18. By using the recycle gas inlet 34, it is thus possible to allow a portion of the recycle gas to bypass the slurry located in the lower sub-reactors 16. In this fashion, the overall gas hold-up in the reactor 10 can be reduced, thereby surprisingly increasing the reactor capacity.

The gaseous reactants, comprising the fresh synthesis gas and any recycle gas, pass upwardly through a slurry body 40 which occupies the slurry channels of the upper and lower sub-reactors 18, 16 and which extends from the bottom of the reactor 10 to the level 38. The slurry body 40 comprises Fischer-Tropsch catalyst particles, typically an iron- or cobalt-based catalyst, suspended in liquid product. The slurry body 40 is controlled to have the slurry level 38 above the open upper ends of the slurry channels 24 of the upper sub-reactors 18 but below the upper ends of the side walls 26 of the upper sub-reactors 18 which extend into the head space 32.

As the synthesis gas bubbles through the slurry body 40, the gaseous reactants therein react catalytically and exothermically to form liquid product, which thus forms part of the slurry body 40. From time to time, or continuously, liquid phase or slurry comprising liquid product is withdrawn through the liquid outlet 36, with the slurry level 38 in each of the upper sub-reactors 18 thus being controlled individually. The catalyst particles are separated from the liquid product in a suitable internal or external separation system, e.g. using filters (not shown). If the separation system is located externally to the reactor 10, an additional system (not shown) to return the separated catalyst particles to the reactor 10 is then provided.

The fresh synthesis feed gas and the recycle gas are introduced into the reactor 10 at a rate sufficient to agitate and suspend all of the catalyst particles inside the reactor 10 without settling. The gas flow rate will be selected depending on the slurry concentration, catalyst density, suspending medium density and viscosity, and particular particle size used. Suitable gas flow rates include, for example, from about 5 cm/s to about 50 cm/s. However, gas velocities up to about 85 cm/s have been tested in bubble columns. The use of higher velocities has the disadvantage that it is accompanied by a higher gas hold-up in the reactor leaving relatively less space to accommodate the catalyst-containing slurry. Whatever gas flow rate is however selected, it should be sufficient to avoid particle settling and agglomeration in the sub-reactors 14.

Some slurry continuously passes downwardly through the downcomer channels thereby to achieve redistribution of catalyst particles within the slurry body 40 and to promote uniform heat redistribution throughout the slurry body 40. As will be appreciated, depending on the arrangement of the downcomer channels in the upper sub-reactors 18 and their associated lower sub-reactors 16, slurry redistribution over selected vertically extending regions of the reactor 10 is possible.

Each sub-reactor 14 is operated so that the slurry bed 40 therein is in a heterogeneous or churn-turbulent flow regime and comprises a dilute phase consisting of fast-rising larger bubbles of gaseous reactants and gaseous product which traverse the slurry body 40 virtually in plug-flow fashion and a dense phase which comprises liquid product, solid catalyst particles and entrained smaller bubbles of gaseous reactants and gaseous product. By means of the use of the sub-reactors 14, the plug-flow behaviour of the entire reactor 10 is promoted, since each sub-reactor 14 has a high aspect ratio well in excess of the aspect ratio of the shell 12.

The slurry body 40 is present in alternate, or open-ended, channels 24 in each sub-reactor 14. Boiler feed water as cooling medium is circulated through the remaining, close-ended, channels 24 to remove the heat of the exothermic reactions. As will be appreciated, the divider walls 22 provide large heat transfer surface areas for removing heat from the slurry body 40.

Light hydrocarbon products, such as a $C_{20}$ and below fraction are withdrawn from the reactor 10 through the gas outlet 30 and passed to a separation unit (not shown). Typically, the separation unit comprises a series of coolers and a vapour-liquid separator and may optionally include further coolers and separators and possibly also a cryogenic unit for removal of hydrogen, carbon monoxide, methane and carbon dioxide from the $C_{20}$ and below hydrocarbon fraction. Other separation technologies such as membrane units, pressure swing adsorption units and/or units for the selective removal of carbon dioxide may be employed. The separated gases comprising nitrogen, carbon monoxide and other gases are compressed and recycled by means of a compressor (not shown) to provide the recycle gas stream. Condensed liquid hydrocarbons and reaction water are withdrawn from the separation unit for further working up.

It is to be appreciated that, although the reactor 10, as illustrated, allows for the recycle of gas to the reactor 10, it is not necessarily so that a recycle gas stream will be employed in all embodiments.

In the embodiment of the invention shown in FIGS. 1 and 2, no slurry flow communication is possible between sub-reactors 14 at the same elevation. It is however quite easy to modify the reactor behaviour to obtain transverse or horizontal slurry flow communication at selected elevations inside the reactor 10. Thus, for example, by removing or modifying the portions of the side walls 26 of the lower sub-reactors 16 extending downwardly below the lower sub-reactors 16, it is possible to allow slurry flow communication between the lower sub-reactors 16 in the bottom of the reactor 10. In a similar fashion, slurry flow communication between the lower sub-reactors 16 or between the upper sub-reactors 18 can also be established in the intermediate zone 20.

Figure 3:
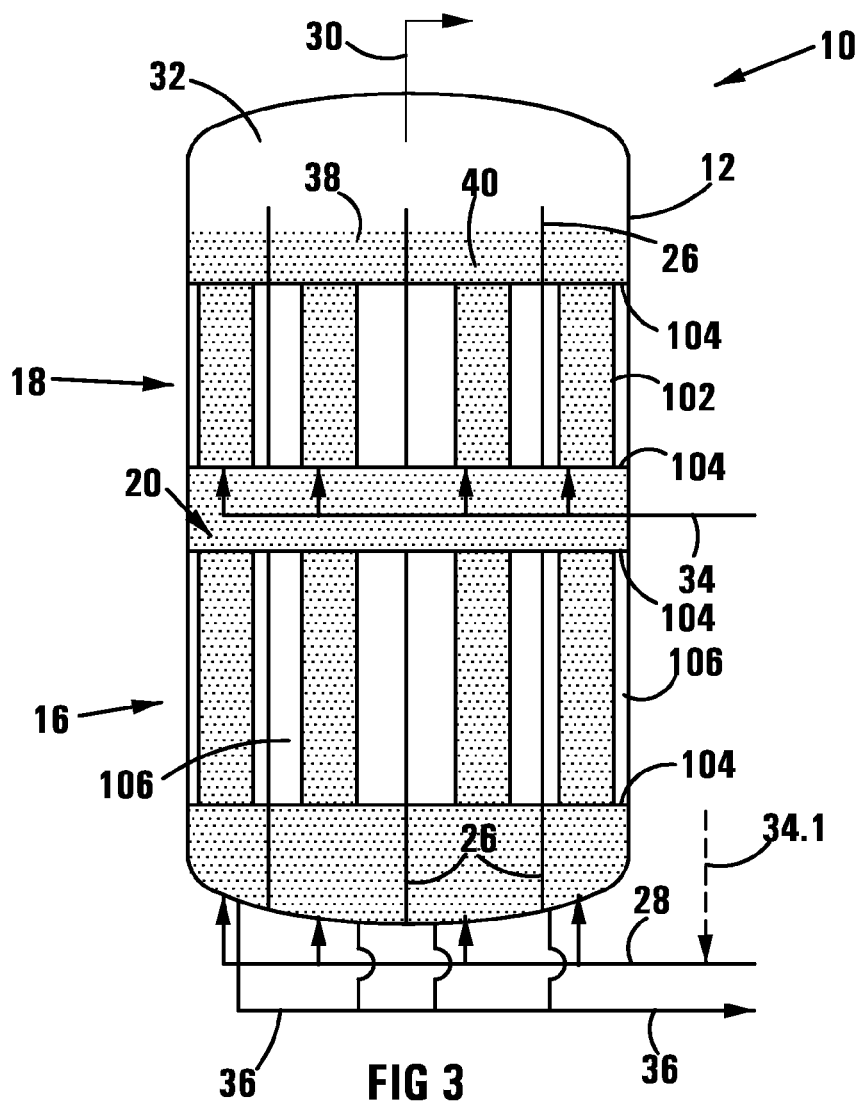
FIG. 3 shows an elevational sectional view of another embodiment of a three-phase slurry reactor in accordance with the invention.
Figure 4:
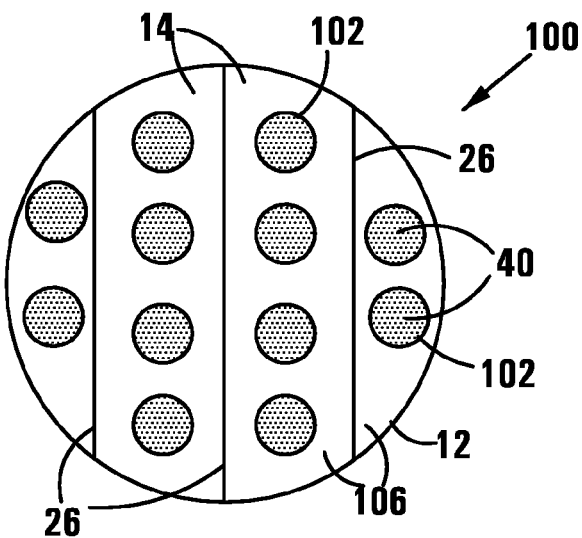
FIG. 4 shows a sectional top plan view of the slurry reactor of FIG. 3.

Referring to FIGS. 3 and 4 of the drawings, another embodiment of a three-phase slurry reactor in accordance with the invention is generally indicated by reference numeral 100. The reactor 100 embodies the same concepts as the reactor 10 and thus includes many parts or features that are the same or similar. These parts or features are indicated by the same reference numerals in FIGS. 3 and 4 as in FIGS. 1 and 2, unless otherwise indicated.

In the reactor 100, the side walls 26 of each sub-reactor define chords of the shell 12, as can be clearly seen in FIG. 4. Instead of having divider walls like the divider walls 22 of the reactor 10, the reactor 100, in each of the sub-reactors 14, has a plurality of vertically extending tubes 102 arranged between upper and lower tube plates 104. Between the side walls 26 and surrounding the tubes 102, a heat transfer medium flow space (boiler feed water flow space) 106 is defined.

The reactor 100 is operated in similar fashion to the reactor 10, with the slurry body 40 occupying the tubes 102. In the embodiment shown in FIGS. 3 and 4, as is the case with the reactor 10, there is no slurry flow communication allowed, between adjacent lower sub-reactors 16, in the bottom of the reactor 100, or between adjacent upper sub-reactors 18, above the upper sub-reactors 18 in the head space 32. However, in the intermediate zone 20, slurry flow communication between adjacent sub-reactors 14 is allowed.

Although not shown in FIGS. 3 and 4, at least some of the tubes 102 may be shaped or textured to increase their heat transfer surface area or to improve heat transfer coefficients. The shaping or texturing may include, amongst other methods known to persons skilled in the art, the use of dimpled, ribbed or finned tubes.

In use, boiler feed water is circulated through the boiler feed water flow spaces 106, typically entering each sub-reactor 14 at a low elevation and leaving at a high elevation.

As with the reactor 10, each sub-reactor 14 of the reactor 100 can easily be provided with piping arrangements as each sub-reactor 14 has a side wall defined by the shell 12.

It is believed that the reactors 10, 100, as illustrated, are of designs which substantially reduce the risk of scaling up from pilot plant scale to commercial plant scale, exhibiting reduced scale dependent macro-mixing effects. It is also believed that these reactor designs can be more readily modelled or predicted from experimentation allowing better combinations of desirable plug flow characteristics and well-mixed characteristics of reactants and products. Design and testing of a single sub-reactor on a pilot scale is possible, with scale-up now merely involving adding sub-reactors. The illustrated reactor designs also provide for high heat transfer surface areas and shared services such as filtration over a serviceable sub-reactor. These designs also allow for vertically staged downcomers reducing the detrimental effect on plug flow behaviour of downcomers acting over the entire reactor height. Catalysts can also be segregated vertically to a greater extent than in prior art reactor designs of which the Applicant is aware. This can advantageously be used, specifically for iron catalysts, to expose less of the catalyst to areas in the reactor with high water partial pressure that negatively affect catalyst activity, leading to increased reactor productivity.

The invention claimed is:

1. A method of operating a three-phase slurry reactor, the method including feeding at a low level at least one gaseous reactant into a vertically extending slurry body of solid particles suspended in a suspension liquid, the slurry body being contained in at least two vertically extending shafts housed side by side within a common reactor shell, each shaft being divided into a plurality of vertically extending channels at least some of which are in slurry flow communication and the slurry body being present in at least some of the channels, at least some of the shafts and/or channels being at least partially defined by heat exchange surfaces;

allowing the gaseous reactant to react as it passes upwardly through the slurry body present in at least some of the channels of the shafts, thereby to form a non-gaseous and/or a gaseous product;

allowing any gaseous product and/or unreacted gaseous reactant to disengage from the slurry body in a head space above the slurry body;

withdrawing any gaseous product and/or unreacted gaseous reactant from the head space; and maintaining the slurry body at a desired level by withdrawing slurry or suspension liquid or by adding slurry or suspension liquid.

2. The method as claimed in claim 1, in which the channels of a shaft are defined by vertically extending divider walls, with the divider walls of a shaft being generally parallel to each other, and divider walls of adjacent shafts being generally perpendicular to each other.

3. The method as claimed in claim 1, in which slurry flow communication between channels in a shaft containing the fluidised or slurry body only occurs at top and/or bottom ends of such channels.

4. The method as claimed in claim 1, in which the solid particles are catalyst particles for catalysing the reaction of the gaseous reactant or gaseous reactants into a product.

5. The method as claimed in claim 4, in which the reaction is Fischer-Tropsch hydrocarbon synthesis.

6. The method as claimed in claim 1, in which at least some individual shafts each have a gaseous reactant inlet, the method including feeding the gaseous reactant or reactants, or a recycle gas to these individual shafts independently from the feed to another shaft.

7. The method as claimed in claim 1, in which at least two of the vertically extending shafts are vertically spaced, with an upper end of a lower shaft being below a lower end of an upper shaft.

8. The method as claimed in claim 7 which includes allowing slurry to pass downwardly from a high level in the slurry body in the upper shaft to a lower level of said upper shaft, and/or which includes allowing slurry to pass downwardly from a high level in the slurry body of the lower shaft to a lower level of said lower shaft.

9. The method as claimed in claim 7, which includes feeding recycle gas at an elevated level into the reactor, so that said recycle gas passes only through the upper shaft or upper shafts and bypasses the lower shaft or lower shafts.

* * * * *